(12) United States Patent
Seufert et al.

(10) Patent No.: US 9,031,976 B2
(45) Date of Patent: May 12, 2015

(54) FLEXIBLE TABLES

(71) Applicants: Thomas Seufert, Plankstadt (DE); Michael Rudolf, Heidelberg (DE); Marcus Paradies, Walldorf (DE); Christof Bornhoevd, Belmont, CA (US); Thomas Mueller, Wiesloch (DE); Daniel Buchmann, Eggenstein (DE); Karl Fuerst, Wiesloch (DE)

(72) Inventors: Thomas Seufert, Plankstadt (DE); Michael Rudolf, Heidelberg (DE); Marcus Paradies, Walldorf (DE); Christof Bornhoevd, Belmont, CA (US); Thomas Mueller, Wiesloch (DE); Daniel Buchmann, Eggenstein (DE); Karl Fuerst, Wiesloch (DE)

(73) Assignee: SAP SE, Walldorf (DE)

( * ) Notice: Subject to any disclaimer, the term of this patent is extended or adjusted under 35 U.S.C. 154(b) by 63 days.

(21) Appl. No.: 13/687,256

(22) Filed: Nov. 28, 2012

(65) Prior Publication Data

US 2014/0149450 A1   May 29, 2014

(51) Int. Cl.
*G06F 17/30* (2006.01)

(52) U.S. Cl.
CPC .............................. *G06F 17/30595* (2013.01)

(58) Field of Classification Search
CPC ............... G06F 17/30595; G06F 17/30607; G06F 17/147; G06F 17/30896; G06F 17/30905; G06F 17/30; G06F 17/30309; G06F 17/30569; G06F 17/2247; G06F 17/30297; G06F 17/303; G06F 17/30424; G06F 17/30442; G06F 17/30489; G06F 17/30539; G06F 17/30554; G06F 17/30867; G06F 17/30321; G06F 17/30477; G06F 17/305; G06F 17/30315; G06F 17/30545; G06F 17/30563; G06F 17/30876; G06F 17/30917; G06F 17/245; G06F 17/246; G06F 17/30067; G06F 17/30286; G06F 17/30289; G06F 17/3061; G06F 17/30861; G06F 17/30923; G06F 17/30908; G06F 17/30578
USPC ......................................... 707/769, 791, 803
See application file for complete search history.

(56) References Cited

U.S. PATENT DOCUMENTS

| | | | |
|---|---|---|---|
| 6,411,959 B1 * | 6/2002 | Kelsey ................................. 1/1 |
| 2003/0204478 A1 * | 10/2003 | Le et al. ............................. 707/1 |
| 2008/0040372 A1 * | 2/2008 | Bissantz ....................... 707/101 |
| 2009/0204463 A1 * | 8/2009 | Burnett et al. ..................... 705/8 |
| 2011/0153576 A1 * | 6/2011 | Figus ............................ 707/692 |
| 2013/0132435 A1 * | 5/2013 | Yeung et al. .................. 707/776 |
| 2013/0166535 A1 * | 6/2013 | Valentin ........................ 707/714 |
| 2013/0205033 A1 * | 8/2013 | Peter ............................. 709/228 |

* cited by examiner

*Primary Examiner* — Shahid Alam
*Assistant Examiner* — Andalib Lodhi
(74) *Attorney, Agent, or Firm* — Buckley, Maschoff & Talwalkar LLC

(57) ABSTRACT

A system includes reception of an instruction to access a column of a database table, determination that the column is not associated with the schema of the database table, determination of whether the schema of the database table is flexible or static, returning, if it is determined that the schema of the database table is static, of an error in response to the instruction, and, if it is determined that the schema of the database table is flexible, not returning an error in response to the instruction.

9 Claims, 4 Drawing Sheets

| Customer ID | Name | Address | State |
|---|---|---|---|
| P132 | ~~~~~~~ | ~~~~~~~ | ~~~~~~~ |
| P434 | ~~~~~~~ | ~~~~~~~ | ~~~~~~~ |
| P562 | ~~~~~~~ | ~~~~~~~ | ~~~~~~~ |

*FIG. 3*

| Name | Country |
|---|---|
| ~~~~~~~ | NULL |
| ~~~~~~~ | NULL |
| ~~~~~~~ | NULL |

*FIG. 4*

| Customer ID | Name | Address | State | Country |
|---|---|---|---|---|
| P132 | ~~~~~~~ | ~~~~~~~ | ~~~~~~~ | NULL |
| P434 | ~~~~~~~ | ~~~~~~~ | ~~~~~~~ | NULL |
| P562 | ~~~~~~~ | ~~~~~~~ | ~~~~~~~ | NULL |
| P855 | John Smith | 123 Elm Street | New York | U.S.A. |

FLEXIBLE TABLES

BACKGROUND

A developer of a relational database system creates a schema which defines the structure of database tables stored within the relational database system. Clients may query data stored in the database tables, and/or insert/update data in the database tables, via relational statements (e.g., Structured Query Language statements) which reference the schema. An error is returned if a received relational statement does not conform to the schema.

BRIEF DESCRIPTION OF THE DRAWINGS

FIG. 3 is a tabular representation of a portion of a database table according to some embodiments.

FIG. 4 is a tabular representation of a portion of a database table according to some embodiments.

FIG. 5 is a tabular representation of a portion of a table according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
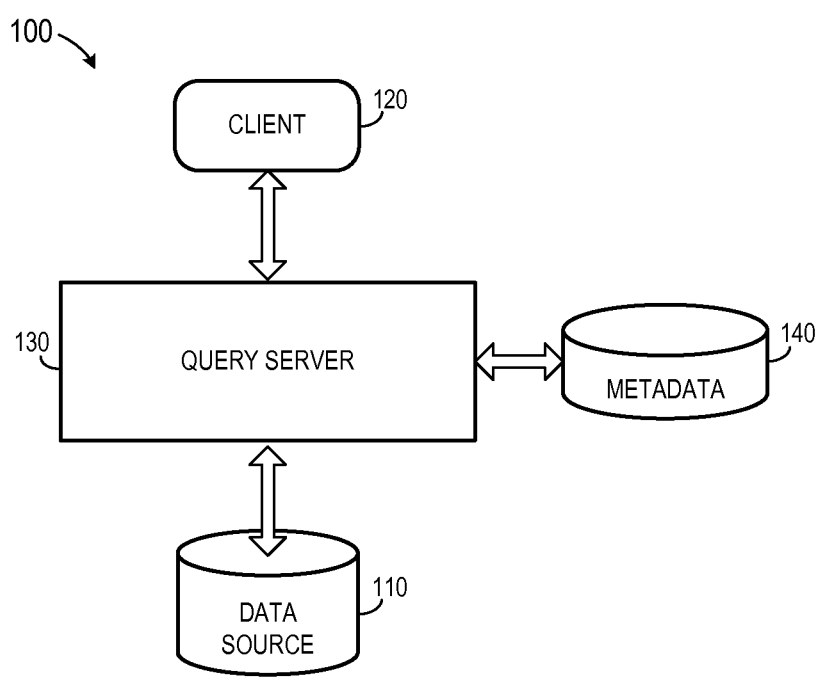
FIG. 1 is a block diagram of a system according to some embodiments.

FIG. 1 is a block diagram of system 100 according to some embodiments. System 100 includes data source 110, client 120, and query server 130. Data source 110 may comprise any query-responsive data source or sources that are or become known, including but not limited to a structured-query language (SQL) relational database management system. Data source 110 may comprise a relational database, a multi-dimensional database, an eXtendable Markup Language (XML) document, or any other data storage system storing structured and/or unstructured data. The data of data source 110 may be distributed among several relational databases, multi-dimensional databases, and/or other data sources. Embodiments are not limited to any number or types of data sources. For example, data source 110 may comprise one or more OnLine Analytical Processing (OLAP) databases, spreadsheets, text documents, presentations, etc.

In some embodiments, data source 110 is implemented in Random Access Memory (e.g., cache memory for storing recently-used data) and one or more fixed disks (e.g., persistent memory for storing their respective portions of the full database). Alternatively, data source 110 may implement an "in-memory" database, in which volatile (e.g., non-disk-based) memory (e.g., Random Access Memory) is used both for cache memory and for storing its entire respective portion of the full database. In some embodiments, the data of data source 110 may comprise one or more of conventional tabular data, row-based data stored in row format, column-based data stored in columnar format, and object-based data. Data source 110 may also or alternatively support multi-tenancy by providing multiple logical database systems which are programmatically isolated from one another. Moreover, the data of data source 110 may be indexed and/or selectively replicated in an index to allow fast searching and retrieval thereof.

Metadata 140 may provide information regarding the structure, relationships and meaning of the data stored within data source 110. This information may be generated by a database administrator. According to some embodiments, metadata 140 includes data defining the schema of database tables stored within data source 110. A database table schema may specify the name of the database table, columns of the database table, the data type associated with each column, and other information associated with the database table. According to some embodiments, a database table schema may specify whether it (i.e., the schema itself) is flexible or static. The distinction between these two schema types, according to some embodiments, will be described below.

Query server 130 generally provides data of data source 110 to reporting clients, such as client 120, in response to instructions (e.g., SQL statements) received therefrom. In some embodiments, query server 130 receives an instruction from client 120. Query server 130 generates an execution plan based on the instruction and on metadata 140. The execution is forwarded to data source 110, which executes the plan and returns a dataset based on the SQL script. Query server 130 then returns the dataset to client 120. Embodiments are not limited thereto.

Client 120 may comprise one or more devices executing program code of a software application for presenting user interfaces to allow interaction with query server 130. Presentation of a user interface may comprise any degree or type of rendering, depending on the type of user interface code generated by query server 130. For example, client 120 may execute a Web Browser to receive a Web page (e.g., in HTML format) from query server 130, and may render and present the Web page according to known protocols. Client 120 may also or alternatively present user interfaces by executing a standalone executable file (e.g., an .exe file) or code (e.g., a JAVA applet) within a virtual machine.

Figure 2:
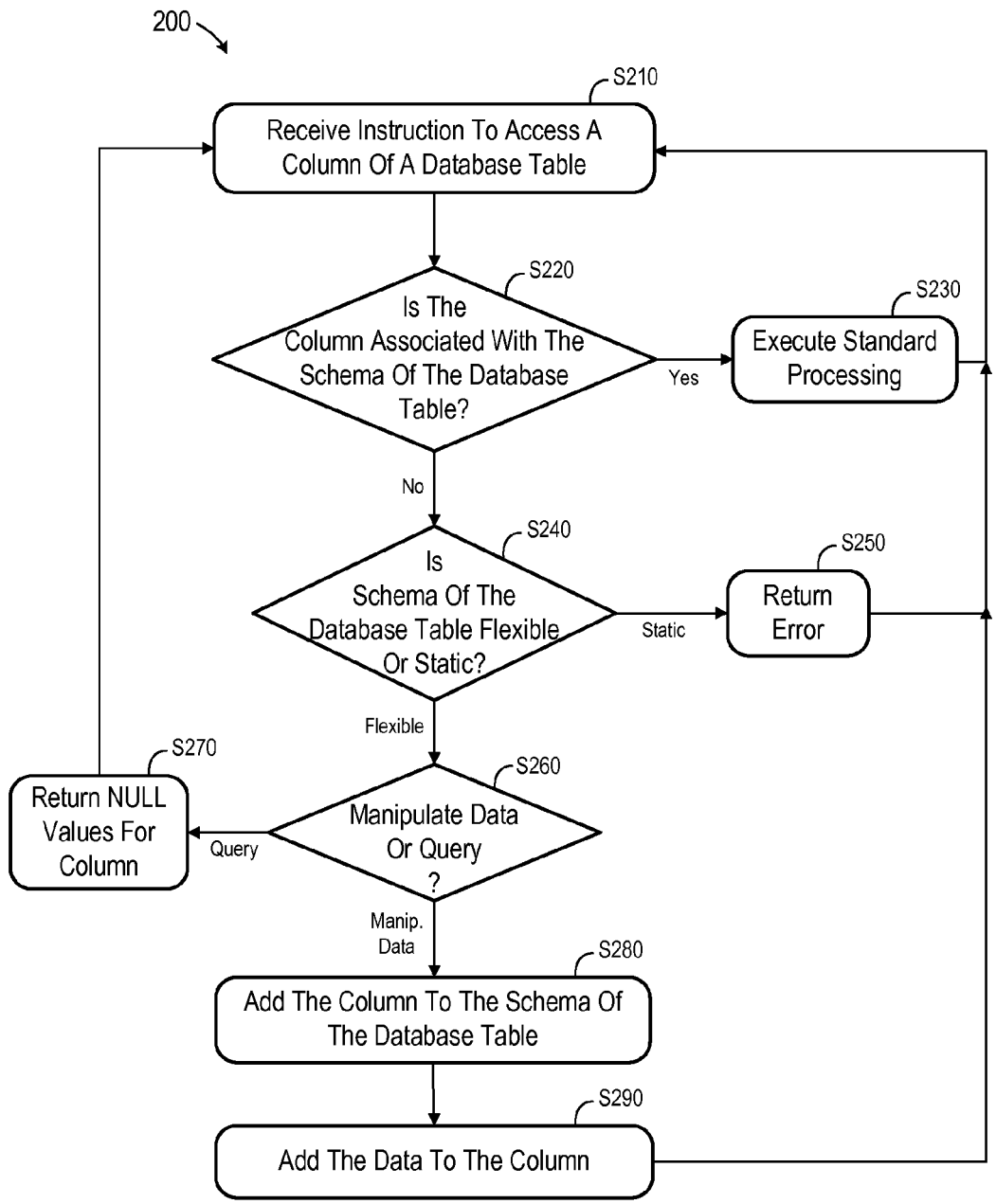
FIG. 2 is a flow diagram of a process according to some embodiments.

FIG. 2 comprises a flow diagram of process 200 according to some embodiments. In some embodiments, various hardware elements of query server 130 execute program code to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, an instruction to access a column of a database table is received at S210. The instruction may be received by query server 130 from client 120. For example, client 120 may call an interface exposed by query server 130 to pass an instruction thereto.

The instruction may comprise an instruction to query a column, to insert one or more values into a column, to update one or more values in a column, to replace one or more values in a column, and/or any other instruction referencing a column of a database table. The instruction may comprise a relational statement such as an SQL statement, but any protocol or instruction type may be utilized in some embodiments.

For purposes of the foregoing example, it will be assumed that the instruction received at S210 is an instruction to access a column of Customer table 300 of FIG. 3. Table 300 includes three columns, each of which is associated with (i.e., defined by) a schema of table 300, which in turn is defined by metadata 140. The values within each row are stored by data source 110, and each row corresponds to a key (i.e., a Customer ID).

At S220, it is determined whether the column of the instruction is associated with a schema of the database table. In a first simple example of S220, the received instruction is:
SELECT Name, Address FROM Customer
The specified columns Name and Address are associated with the schema of database table 300, so flow proceeds to S230 to respond to the instruction by executing standard processing. As mentioned above, this processing may include generation of an SQL script based on the instruction and on metadata 140, forwarding the SQL script to data source 110, receiving a result set from data source 110, and returning the result set to client 120.

In another example of S220, the received instruction is:
INSERT INTO Customer (Customer ID, Name, Address, State) VALUES ('P855', 'John Smith', '123 Elm Street', 'New York')
Again, each column of the instruction is associated with the schema of database table 300 as shown in FIG. 4, so flow proceeds to S230 to respond to the instruction by executing standard processing.

In yet another example of S220, it will be assumed that the received instruction is:
UPDATE Customer SET Address='50 Main Avenue' WHERE Name='John Smith' Flow will again proceed from S220 to S230 in this example since both columns of the instruction (i.e., Name and Address) are associated with the schema of database table 300.

In all cases mentioned above, flow returns to S210 from S230 to await another instruction.

An example will now be described in which the following instruction is received at S210:
SELECT Name, Country FROM Customer
Referring to FIG. 3, it is determined at S220 that the column Country is not associated with the schema of table 300. Flow therefore continues to S240, where it is determined whether the schema of table 300 is "flexible" or "static". "Static" generally refers to traditional behavior, in which the schema of a table is not permitted to change in response to instructions to access a column of table. In the case of a "flexible" table, columns may be added to its schema in response to received instructions to access the table as described herein. A database administrator may define a table as "flexible" when creating and/or modifying the definition of the database table. Such a definition may be stored in metadata 140.

If the Customer table is static and the above instruction is received, an error is returned to the client at S250. However, assuming the schema of the Customer table is flexible, it is determined at S260 whether the instruction is an instruction to manipulate data of a non-associated column or to query a non-associated column. Since the instruction of the present example is an instruction to query the non-associated Country column, flow proceeds to S270.

A result set is returned at S270. The result set is formulated as if the table includes the non-associated column, and the non-associated column includes only NULL values. FIG. 4 illustrates a result set returned at S270 in response to the instruction SELECT Name, Country FROM Customer according to some embodiments, in a case that the schema of the Customer table is flexible. In contrast, a conventional query server would return an error in response to this instruction due to the absence of the Country column from the schema of table 300. Flow then returns to S210 and continues as described above.

In another example, it is assumed that the following instruction is received at S210:
INSERT INTO Customer (Name, Address, State, Country) VALUES ('John Smith', '123 Elm Street', 'New York', 'U.S.A.')
Again, it is determined at S220 that the column Country is not associated with the schema of table 300. It will also be assumed that the schema of the Customer table is flexible, so flow will proceed from S240 to S260. At S260, it is determined that the instruction is an instruction to manipulate data (i.e., a Data Manipulation Language (DML) statement). Flow therefore continues to S280.

At S280, the non-associated column is added to the schema of the database table. According to some embodiments of S280, a Data Description Language (DDL) operation is triggered to change the schema in metadata 140. Next, data is added to the column based on the instruction at S290. Again, flow then returns to S210 to await a next instruction.

FIG. 5 illustrates table 300 after execution of process 200 in response to the instruction set forth above. The column Country has been created and a row has been added which includes values corresponding to the received instruction.

Embodiments are not limited to the query or manipulation of a single non-associated column. For example, a received instruction may specify manipulation of two or more non-associated columns of a flexible table. Accordingly, those two or more columns may be added to the schema of the table and manipulated as described above.

According to some embodiments, a flexible table may be stored in columnar format. For example, the values within a single column are stored in consecutive memory locations. Such an arrangement may facilitate the addition of a column to a table, because a contiguous block of memory to store values of the column is simply allocated when the column is added to the table schema. The deletion of columns is also facilitated, since the blocks of memory associated with deleted columns can be similarly de-allocated. A flexible table may also or alternatively be implemented using row-oriented table representations.

Figure 6:
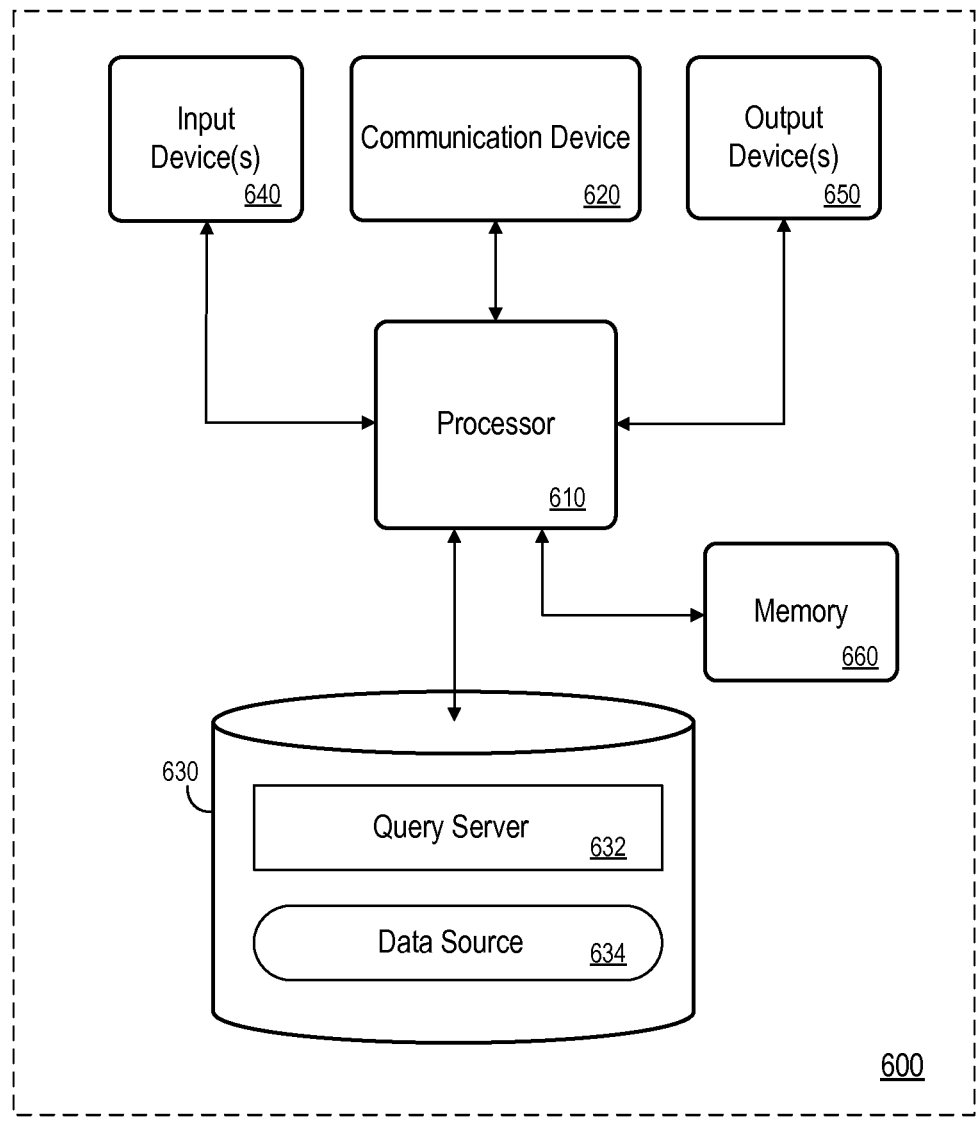
FIG. 6 is a block diagram of an apparatus according to some embodiments.

FIG. 6 is a block diagram of apparatus 600 according to some embodiments. Apparatus 600 may comprise a general-purpose computing apparatus and may execute program code to perform any of the functions described herein. Apparatus 600 may comprise an implementation of query server 130 and data source 110, or of the entirety of system 100. Apparatus 600 may include other unshown elements according to some embodiments.

Apparatus 600 includes processor 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Query server 632 may comprise program code executed by processor 610 to cause apparatus 600 to perform any one or more of the processes described herein. Embodiments are not limited to execution of these processes by a single apparatus. Data source 634 may implement data source 110 as described above. As also described above, data source 110 may be implemented in volatile memory such as memory 660. Data storage device 630 may also store data and other program code for providing additional functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a data storage device storing a database table including a first set of columns;
a computing device comprising:
a memory storing processor-executable program code; and
a processor to execute the processor-executable program code in order to cause the computing device to:
receive an instruction to insert a record into the database table, the record including data associated with each column of the first set of columns, and including other data associated with a second column;
determine that the second column is not included in a schema of the database table, wherein the schema specifies columns of the database table;
determine whether the schema of the database table specifies the database table is flexible or static;
if it is determined that the schema of the database table is static, return an error in response to the instruction; and
if it is determined that the schema of the database table is flexible, add a new column to the schema of the database table and insert the data of the record into respective ones of the first set of columns and the other data of the record into the new column.

2. A system according to claim 1, wherein the processor is to further execute the processor-executable program code in order to cause the computing device to:
receive a second instruction to query a third column of the database table;
determine that the third column is not included in the schema of the database table; and
if it is determined that the schema of the database table is flexible, return a NULL value associated with the third column in response to the second instruction.

3. A system according to claim 1, wherein the data storage device stores the database table in columnar format.

4. A non-transitory computer-readable medium storing program code, the program code executable by a processor of a computing system to cause the computing system to:
receive an instruction to insert a record into a database table including a first set of columns, the record including data associated with each column of the first set of columns, and including other data associated with a second column;
determine that the second column is not included in a schema of the database table, wherein the schema specifies columns of the database table;
determine whether the schema of the database table specifies the database table is flexible or static;
if it is determined that the schema of the database table is static, return an error in response to the instruction; and
if it is determined that the schema of the database table is flexible, add a new column to the schema of the database table and insert the data of the record into respective ones of the first set of columns and the other data of the record into the new column.

5. A medium according to claim 4, wherein the processor is to further execute the processor-executable program code in order to cause the computing device to:
receive a second instruction to query a third column;
determine that the third column is not included in the schema of the database table; and
if it is determined that the schema of the database table is flexible, return a NULL value associated with the third column in response to the second instruction.

6. A medium according to claim 4, wherein the database table is stored in columnar format.

7. A computer-implemented method for a computing device comprising a memory storing processor-executable program code and a processor to execute the processor-executable program code to cause the computing device to perform the method, the method comprising:
receiving an instruction to insert a record into a database table including a first set of columns, the record including data associated with each column of the first set of columns, and including other data associated with a second column;
determining that the second column is not included in a schema of the database table, wherein the schema specifies columns of the database table;
determining whether the schema of the database table specifies the database table is flexible or static;
if it is determined that the schema of the database table is static, returning an error in response to the instruction; and
if it is determined that the schema of the database table is flexible, add a new column to the schema of the database table and insert the data of the record into respective ones of the first set of columns and the other data of the record into the new column.

8. A method according to claim 7, the method further comprising:
   receiving a second instruction to query a third column of the database table;
   determine that the third column is not included in the schema of the database table; and
   if it is determined that the schema of the database table is flexible, returning a NULL value associated with the third column in response to the second instruction.

9. A method according to claim 7, wherein the database table is stored in columnar format.

* * * * *